United States Patent Office 3,597,421
Patented Aug. 3, 1971

3,597,421
CEPHALOSPORIN SULFOXIDES
J. Allan Webber, Indianapolis, Ind., assignor to Eli Lilly and Company, Indianapolis, Ind.
No Drawing. Filed Jan. 21, 1969, Ser. No. 792,815
Int. Cl. C07d 99/24
U.S. Cl. 260—243
5 Claims

ABSTRACT OF THE DISCLOSURE

A number of novel 3-functionalizedmethyl cephalosporin sulfoxides which are useful intermediates in the preparation of cephalosporin antibiotics are disclosed and claimed. These novel sulfoxides are obtained by the oxidation of the corresponding cephalosporin compounds.

BACKGROUND OF THE INVENTION

This invention concerns a number of novel 3-functionalizedmethyl cephalosporin sulfoxides which are useful intermediates in the preparation of biologically active cephalosporin derivatives containing a 3-functionalizedmethyl group.

In recent years antibiotics of the cephalosporin family have become increasingly important in the treatment of disease. The cephalosporins of choice have been obtained by the chemical modification of fermentation-derived cephalosporin C or by the chemical modification of penicillins in accordance with the process of Morin and Jackson (U.S. Pat. 3,275,636). This chemical modification is necessary in order to obtain products having sufficient biological activity to be of practical utility.

One method of chemical modification of cephalosporins is that described in co-pending application Ser. No. 703,523, filed Feb. 7, 1968, now abandoned. That application describes a process whereby the 3-methyl group of a cephalosporin derived from penicillin can be brominated and then reacted with a nucleophilic reagent to obtain a 3-functionalizedmethyl derivative. In order to accomplish the bromination step the $\Delta^3$ double bond must be isomerized to the 2-position. At the completion of the reaction it is then necessary to isomerize the double bond back to the 3-position. This shift of the double bond to the 3-position can be accomplished by oxidation of the $\Delta^2$ compound to obtain a sulfoxide. A process for this oxidation is described in copending application Ser. No. 764,939 filed Oct. 3, 1968.

SUMMARY

I have now prepared a number of novel 3-functionalizedmethyl cephalosporin sulfoxides which are useful as intermediates in the process described and claimed in copending application 703,523. These cephalosporin sulfoxides are those wherein the 3-methyl group is substituted with cyano, hydroxy, or alkoxy as described below.

DESCRIPTION OF THE PREFERRED EMBODIMENT

The cephalosporin sulfoxides of my invention are those having the formula

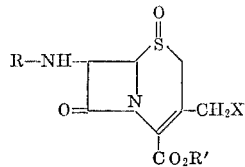

wherein R is an amino blocking group, R' is an ester group, and X is cyano, hydroxy, or alkoxy. These cephalosporin sulfoxides are useful in the preparation of biologically active cephalosporin antibiotics in accordance with the process described in co-pending application Ser. No. 703,523, now abanboned.

Amino protecting groups are well known in the art and are described for example in U.S. Pats. 2,479,295 through 2,479,297; 2,562,407 through 2,562,411 and 2,623,876. Groups such as trimethylphenyl, butoxycarbonyl, and trimethylsilyl may be employed; however the preferred amino protecting group is an acyl group of the type well known in the penicillin and cephalosporin art. Such acyl groups are described, for example, in co-pending application Ser. No. 703,523, now abandoned. A particularly preferred amino protecting group is an acyl group of the formula

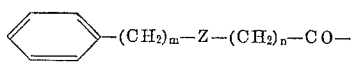

wherein $m$ is an integer of 0 to 4 inclusive, $n$ is an integer of 1 to 4 inclusive, and Z is oxygen or a chemical bond, and such acyl groups substituted on phenyl carbon atoms with fluorine, chlorine, bromine, iodine, $C_1$ to $C_6$ alkyl, $C_1$ to $C_6$ alkoxy, nitro, cyano, or trifluoromethyl groups. It is also possible to replace 1 or 2 of the hydrogens on the carbon atoms of the $m$ or $n$ groups with methyl groups. A few representative examples of such acyl groups include phenylacetyl, phenoxyacetyl, benzyloxyacetyl, 3-methylphenylbutyl, 4-propylbenzyloxyacetyl, phenylpropionyl, phenylbutoxybutyryl, 3-fluorophenoxyacetyl, 4-bromophenylacetyl, 2-chlorobenzyloxypropionyl, phenyl-α-α-dimethylacetyl, 4-nitrophenoxyacetyl, 3-cyanophenylpropionyl, 4-trifluorophenoxyacetyl, and the like. The particular acyl group present as the amino blocking group in the final cephalosporin antibiotic influences biological activity of the antibiotic. The choice of an acyl group which will lead to the desired activity is well within the skill of those familiar with the cephalosporin art.

The carboxyl group in the 4-position of my sulfoxides may be present as the free acid, in which case R' is hydrogen; however, it is preferably present as an ester. Frequently a carboxyl group is esterified to protect it during chemical modification of another portion of the molecule. In such cases it is preferred to use an esterifying group that may be easily removed to regenerate the free acid. Thus, R' is preferably $C_4$ to $C_6$ tertiary alkyl such as t-butyl, t-amyl, and t-hexyl; $C_5$ to $C_8$ tertiary alkenyl such as 1,1-dimethyl-2-butenyl, 1,1-dimethyl-2-pentenyl, and 1,1-dimethyl-2-hexenyl; $C_5$ to $C_8$ tertiary alkynyl such as 1,1-dimethyl-2-butynyl, 1,1-dimethyl-2-pentynyl, and 1,1-dimethyl-2-hexynyl; benzyl; methoxybenzyl; nitrobenzyl; benzhydryl; phthalimidomethyl; succinimidomethyl; trimethylsilyl; or a phenacyl group.

The substituent on the 3-methyl group represented by X may be —CN or —OR" wherein R" is hydrogen; $C_1$ to $C_{10}$ alkyl; $C_3$ to $C_{10}$ alkenyl; $C_3$ to $C_{10}$ alkynyl; $C_5$ to $C_7$ cycloalkyl; $C_5$ to $C_7$ cycloalkyl-$C_1$ to $C_3$ alkyl; $C_2$ to $C_{10}$ haloalkyl; $C_3$ to $C_{10}$ haloalkenyl, and $C_3$ to $C_{10}$ haloalkynyl where the halogen is fluorine, chlorine, bromine, or iodine; phenyl-$C_1$ to $C_3$ alkyl which may be substituted on phenyl carbon atoms with halogen, trifluoromethyl, cyano, $C_1$ to $C_3$ alkoxy, $C_1$ to $C_3$ alkyl, nitro, and carbo-$C_1$ to $C_3$ alkoxy; $C_1$ to $C_3$ alkyl-O-$C_2$ to $C_6$ alkyl; $C_2$ to $C_4$ alkanoyloxy-$C_2$ to $C_6$ alkyl; $C_1$ to $C_6$ alkoxycarbonyl-$C_1$ to $C_6$ alkyl; cyano-$C_2$ to $C_6$ alkyl; $C_2$ to $C_4$ alkanoyl-$C_1$ to $C_4$ alkyl; thienyl-$C_1$ to $C_3$ alkyl; tetrahydrofuryl-$C_1$ to $C_3$ alkyl; 3'-tetrahydrofuryl; or furyl-$C_0$ to $C_2$ alkyl.

Examples of such groups include methyl, ethyl, isopropyl, t-butyl, hexyl, acetyl, decyl, allyl, 3-butenyl, 3-hexenyl, 4-octenyl, 9-decenyl, propargyl, 3-butynyl, 3-hexynyl 4-octynyl, cyclopentyl, cyclohexyl, cycloheptyl, cyclopentylethyl, cyclohexylpropyl, 4-chlorobutyl, 2-chloroethyl, 2-bromopropyl, 2-chloro-2-butenyl, 2-chloro-3-butynyl, furyl, 2-furfuryl, 3-furylethyl, tetrahydrofuryl, tetrahydrofurfuryl, 2-thienylmethyl, 2-cyanoethyl, 3-cyanopropyl, benzyl, anisyl, p-nitrobenzyl, phenylethyl, p-trifluoromethylphenylethyl, p-cyanobenzyl, propyloxyethyl, methoxyethyl, ethoxyethyl, propionylethyl, butanoyloxypropyl, and butoxycarbonylethyl.

The identities of R and R' are not critical to my compounds; groups equivalent to those I have named are well known to those in the cephalosporin art. The value of X may vary within the limits described above. The preferred compounds of my invention are those in which X is cyano, hydroxy, methoxy, or ethoxy.

The cephalosporin sulfoxides of my invention may be prepared by any convenient means. My invention lies in the compounds themselves, and not their method of preparation. A particularly effective method of preparation is that described in copending application Ser. No. 764,939. In accordance with that process the corresponding cephalosporin is treated with an oxidizing agent which is an inorganic peracid having a reduction potential of at least +1.50 and containing only nonmetallic elements, an organic carboxylic peracid, or a mixture of hydrogen peroxide and an acid having a dissociation constant of at least $10^{-5}$. For best results at least one equivalent of oxidizing agent per mole of cephalosporin compound should be employed. Preferably, a slight excess of 10 or 20 percent of oxidizing agent is used. To minimize further oxidation of the sulfoxide to the sulfone mild conditions are recommended. The reaction should be conducted at a temperature within the range of $-50°$ to $100°$ C., preferably within the range of $-10°$ to $+40°$ C.

The preparation of representative members of my group of cephalosporin sulfoxides will be illustrated by the following examples. These examples are merely illustrative and are not intended to limit the scope of my invention in any way.

EXAMPLE 1

To a solution of 372 mg. of p-methoxybenzyl 3-cyanomethyl-7-phenoxyacetamido-$\Delta^2$-cephem-4-carboxylate in 300 ml. of isopropyl alcohol was added a solution of 130 mg. of m-chloroperbenzoic acid in isopropyl alcohol. The reaction mixture was stirred overnight at room temperature. At the end of this reaction period the mixture was filtered to recover 210 mg. of p-methoxybenzyl 3-cyanomethyl-7-phenoxyacetamido-$\Delta^3$-cephem-4-carboxylate-1-oxide with a melting point of 204°–207° C. which had precipitated from the reaction mixture. To recover additional product the filtrate was evaporated to dryness, the residue was taken up in ethyl acetate, the solution was washed successively with sodium bicarbonate solution and sodium chloride solution, dried over magnesium sulfate, filtered, and evaporated to yield 160 mg. of an oil from which 45 mg. of sulfoxide crystallized after methanol was added. The structure of the sulfoxide was verified by spectral methods.

EXAMPLE 2

To a solution of 100 mg. of p-methoxybenzyl 3-methoxymethyl-7-phenoxyacetamido-$\Delta^2$-cephem - 4 - carboxylate in forty ml. of isopropyl alcohol was added 37 mg. of 85 percent m-chloroperbenzoic acid in 4 ml. of isopropyl alcohol. Within a few minutes the sulfoxide began to precipitate. The reaction mixture was stirred for one hour and 63 mg. of p-methoxybenzyl 3-methoxymethyl-7-phenoxyacetamido - $\Delta^3$ - cephem-4-carboxylate-1-oxide was collected by suction filtration. This product had a melting point of 190° to 192° C. The structure was verified by spectral means and elemental analysis.

*Analysis.*—Calculated for $C_{25}H_{26}N_2O_8S$ (percent): C, 58.35; H, 5.07; N, 5.44. Found (percent): C, 58.20; H, 5.23; N, 5.45.

EXAMPLE 3

To a solution of 581 mg. of p-methoxybenzyl 3-hydroxy-methyl-7-phenoxyacetamido - $\Delta^2$ - cephem-4-carboxylate in 70 ml. of isopropyl alcohol and 6 ml. of methylene chloride was added 244 mg. of 85 percent m-chloroperbenzoic acid in 11 ml. of isopropyl alcohol. Within minutes a flocculent precipitate appeared. After stirring for four hours the reaction mixture was filtered giving 427 mg. of p-methoxybenzyl 3-hydroxymethyl-7-phenoxyacetamido-$\Delta^3$-cephem-4-carboxylate-1-oxide having a melting point of 157° to 161° C. A second crop of crystals was obtained from the mother liquor. The structure was confirmed by spectral means and elemental analysis.

EXAMPLE 4

To a stirred solution of 1 g. of t-butyl 3-hydroxymethyl-7-phenoxyacetamido-$\Delta^2$-cephem-4-carboxylate in 150 ml. of isopropyl alcohol and 25 ml. of methylene chloride at ice temperature was added dropwise a solution of 0.430 g. of 85 percent m-chloroperbenzoic acid in 65 ml. of isopropyl alcohol. Upon completion of the addition the solvents were removed under vacuum and the residue was dissolved in ethyl acetate. The ethyl acetate solution was washed successively with 10 percent sodium bicarbonate solution and water and the ethyl acetate was evaporated to dryness to give 1.10 g. of crude product which was crystallized from ethyl acetate to give a product melting at 146°–148° C. The nuclear magnetic resonance spectrum showed the product to be t-butyl 3-hydroxymethyl-7-phenoxyacetamido-$\Delta^3$-cephem-4-carboxylate-1-oxide.

*Analysis.*—Calculated for $C_{21}H_{26}N_2O_7S$ (percent): C, 54.91; H, 5.76; N, 6.40. Found (percent): C, 55.67; H, 5.60; N, 6.27.

EXAMPLE 5

To a cooled solution of 2.56 g. of p-methoxybenzyl 3 - ethoxymethyl - 7 - phenoxyacetamido-$\Delta^3$-cephem-4-carboxylate in 250 ml. of 10:1 isopropyl alcohol-methylene chloride was added a solution of 1.0 g. of m-chloroperbenzoic acid in 150 ml. of isopropyl alcohol. The addition required 1½ hours and the reaction mixture was stirred another 30 minutes in the cold and 2 hours at room temperature. The precipitated p-methoxybenzyl 3-ethoxymethyl - 7 - phenoxyacetamido-$\Delta^3$-cephem-4-carboxylate-1-oxide was collected by suction filtration and dried to give 1.5 g. (55% yield), melting point, 188–189° C. The structure was confirmed by infrared, ultraviolet and nuclear magnetic resonance spectra and elemental analysis.

*Analysis.*—Calculated for $C_{26}H_{28}N_2O_8S$ (percent): C, 59.08; H, 5.34; N, 5.30. Found (percent): C, 59.01; H, 5.34; N, 5.42.

I claim:
1. A cephalosporin sulfoxide having the formula

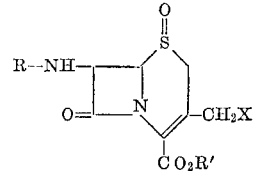

wherein
R is triphenylmethyl, butoxycarbonyl, trimethylsilyl or an acyl group having the formula

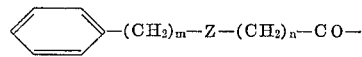

wherein Z is oxygen or a chemical bond, $m$ is an integer of 0 to 4 inclusive, and $n$ is an integer of 1 to 4 inclusive, and such acyl groups substituted on phenyl carbon atoms with fluorine, chlorine, bromine, iodine, $C_1$ to $C_6$ alkyl, $C_1$ to $C_6$ alkoxy, nitro, cyano, or trifluoromethyl groups;

R' is $C_4$ to $C_6$ tertiary alkyl, $C_5$ to $C_8$ tertiary alkenyl, $C_5$ to $C_8$ tertiary alkynyl, benzyl, methoxybenzyl, nitrobenzyl, benzhydryl, phthalimidomethyl, succinimidomethyl, trimethylsilyl, or phenacyl; and X is —CN or —OR'', wherein R'' is hydrogen, $C_1$ to $C_{10}$ alkyl, $C_3$ to $C_{10}$ alkenyl, $C_3$ to $C_{10}$ alkynyl, $C_5$ to $C_7$ cycloalkyl, $C_5$ to $C_7$ cycloalkyl-$C_1$ to $C_3$ alkyl, $C_2$ to $C_{10}$ haloalkyl, $C_3$ to $C_{10}$ haloalkenyl, $C_3$ to $C_{10}$ haloalkynyl, $C_1$ to $C_3$ alkyl-O-$C_2$ to $C_6$ alkyl, $C_2$ to $C_4$ alkanoyloxy-$C_2$ to $C_6$ alkyl, $C_1$ to $C_6$ alkoxycarbonyl-$C_1$ to $C_6$ alkyl, cyano-$C_2$ to $C_6$ alkyl, $C_2$ to $C_4$ alkanoyl-$C_1$ to $C_4$ alkyl, tetrahydrofuryl-$C_1$ to $C_3$ alkyl, 3'-tetrahydrofuryl, furyl-$C_0$ to $C_2$ alkyl, thienyl-$C_1$ to $C_3$ alkyl, or phenyl-$C_1$ to $C_3$ alkyl which may be substituted on phenyl carbon atoms with halogen, trifluoromethyl, cyano, $C_1$ to $C_3$ alkoxy, $C_1$ to $C_3$ alkyl, nitro, or carbo-$C_1$ to $C_3$ alkoxy.

2. A compound as in claim 1 wherein X is cyano.
3. A compound as in claim 1 wherein X is hydroxy.
4. A compound as in claim 1 wherein X is methoxy.
5. A compound as in claim 1 wherein X is ethoxy.

References Cited

UNITED STATES PATENTS

| | | | |
|---|---|---|---|
| 3,243,435 | 3/1966 | Cowley et al. | 260—243C |
| 3,275,626 | 9/1966 | Morin et al. | 260—243C |

NICHOLAS R. RIZZO, Primary Examiner